Nov. 19, 1963   J. MARTIN   3,110,926
APPARATUS FOR THE TREATMENT OF EDIBLE CRUSTACEA
Filed April 19, 1960   6 Sheets-Sheet 1
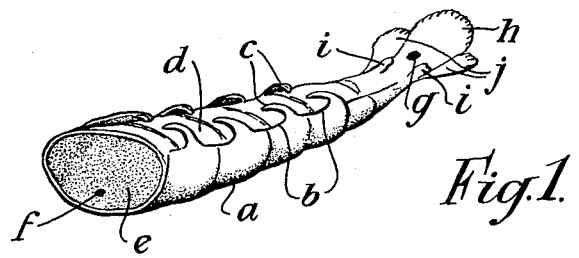
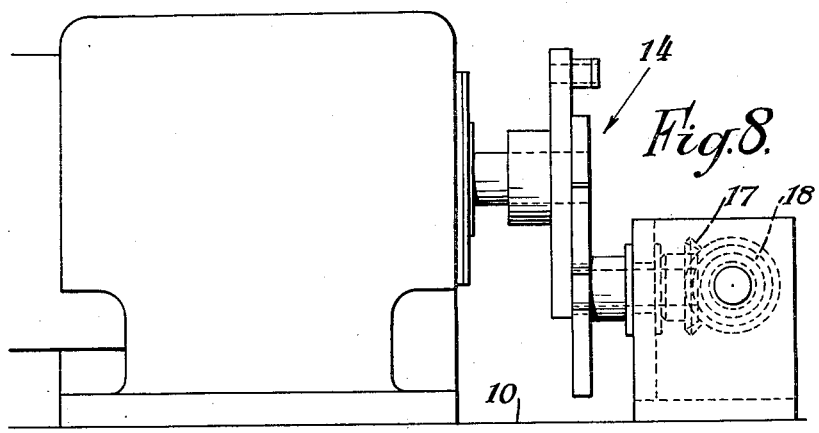
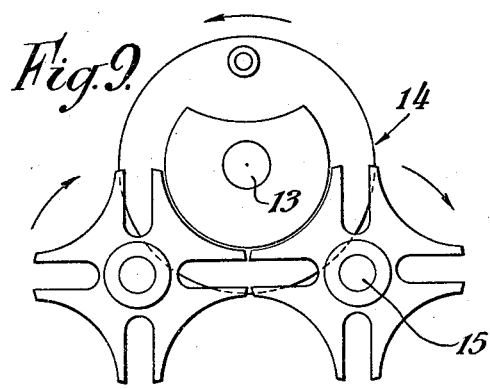
INVENTOR
JOHN MARTIN
BY
ATTORNEY Nov. 19, 1963　　　　　J. MARTIN　　　　　3,110,926
APPARATUS FOR THE TREATMENT OF EDIBLE CRUSTACEA
Filed April 19, 1960　　　　　　　　　　　　　6 Sheets-Sheet 2
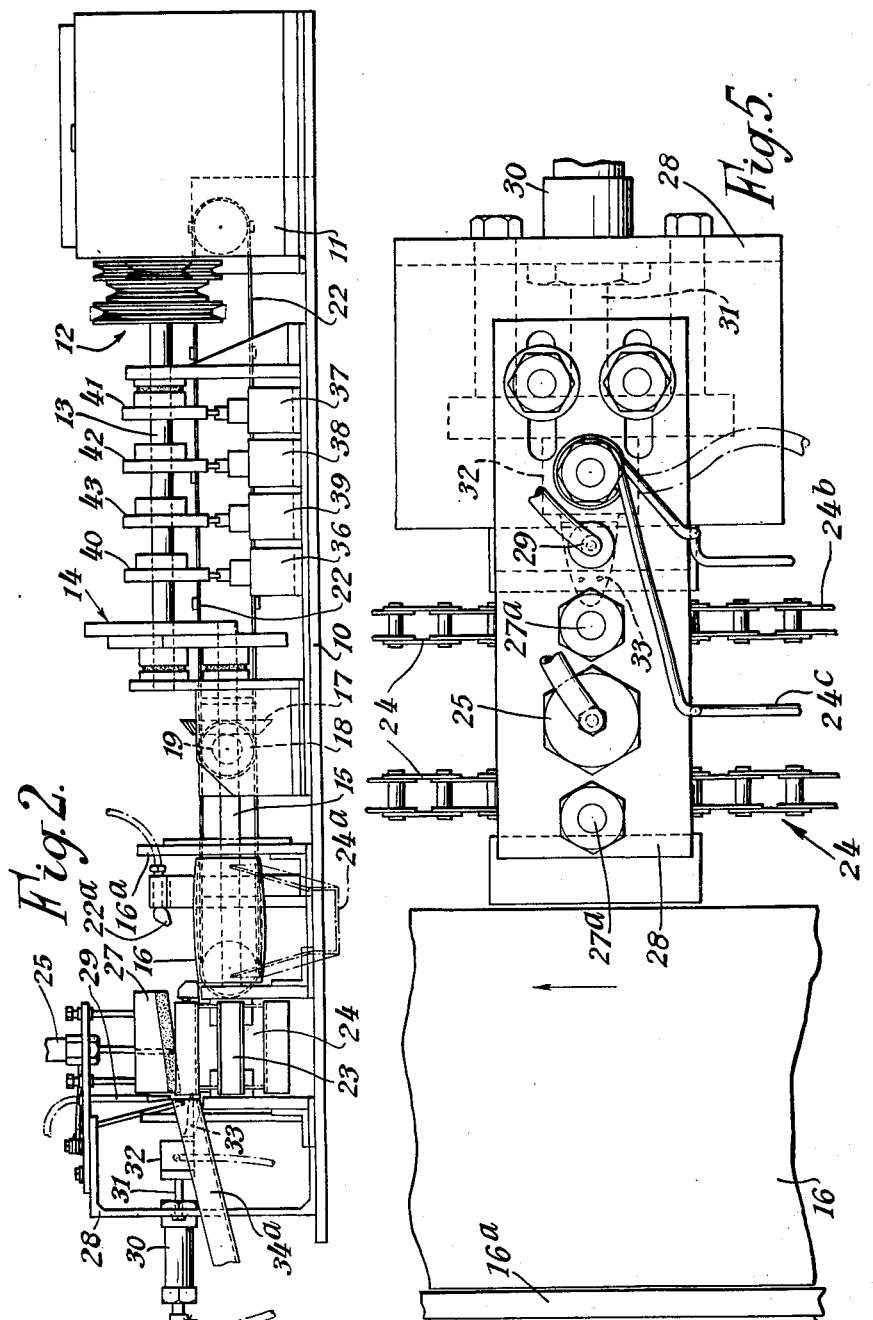
INVENTOR
JOHN MARTIN
BY
John Howard Pearson
ATTORNEY

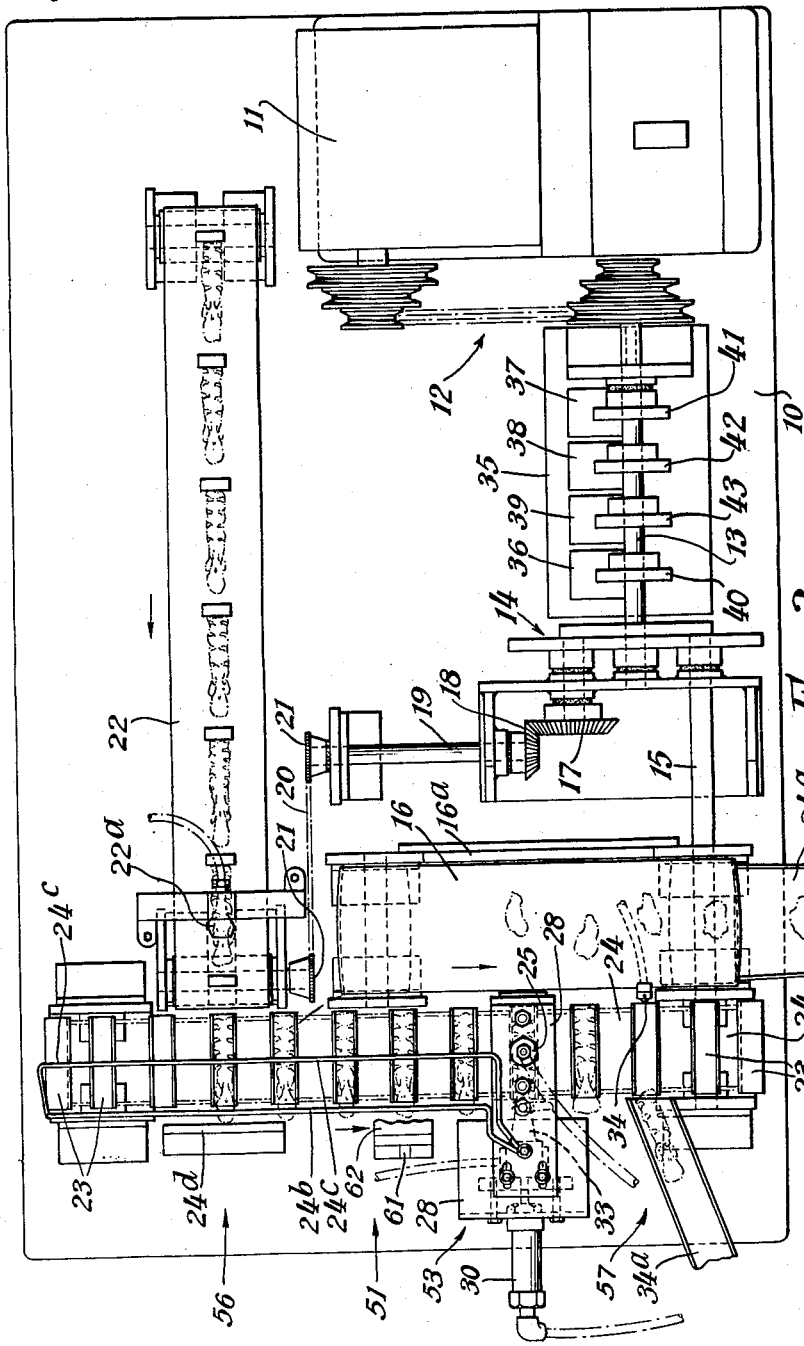

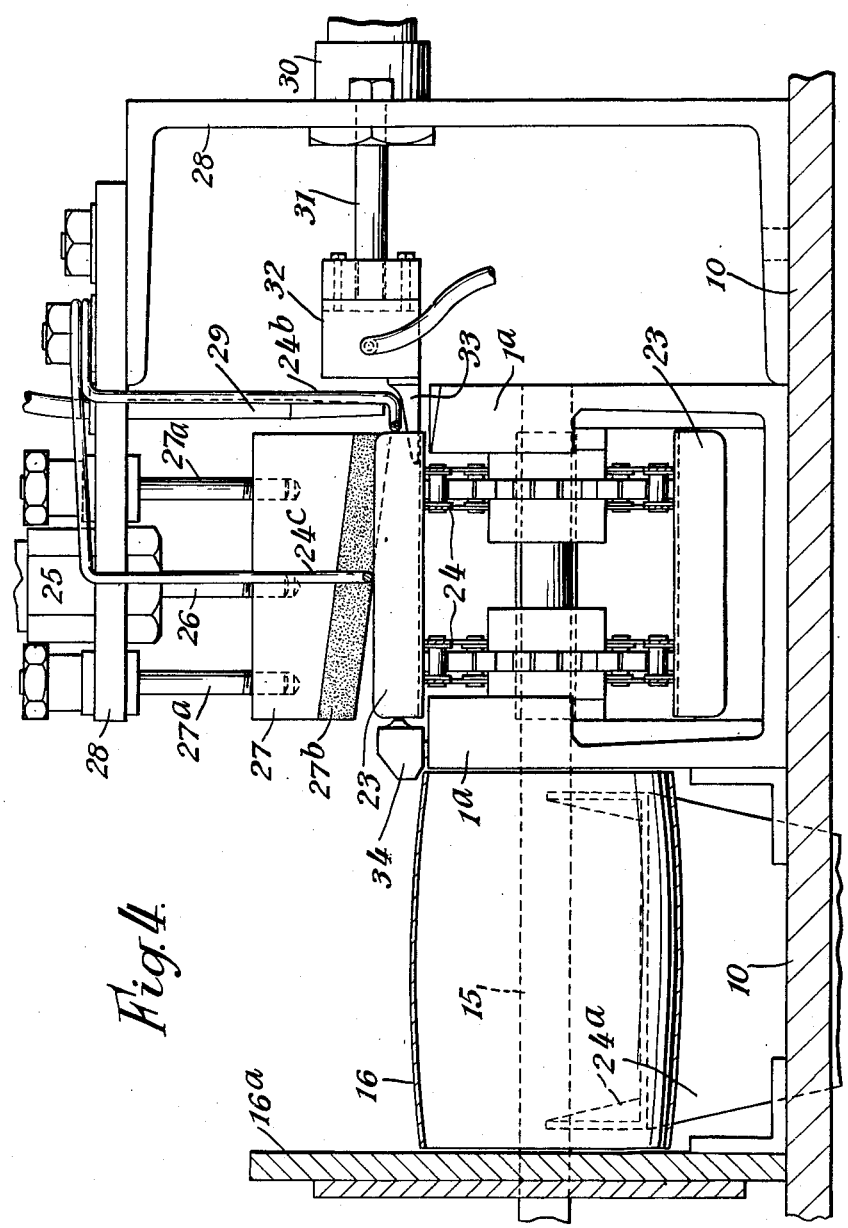

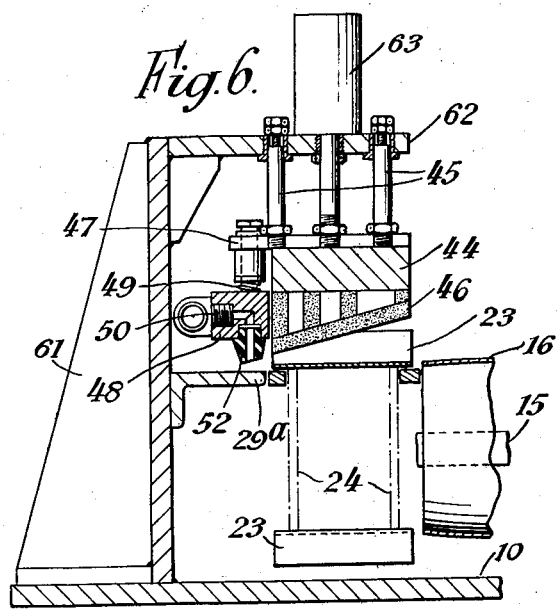
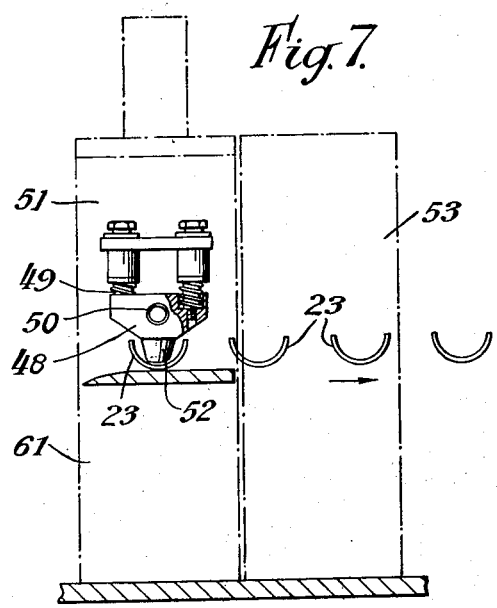

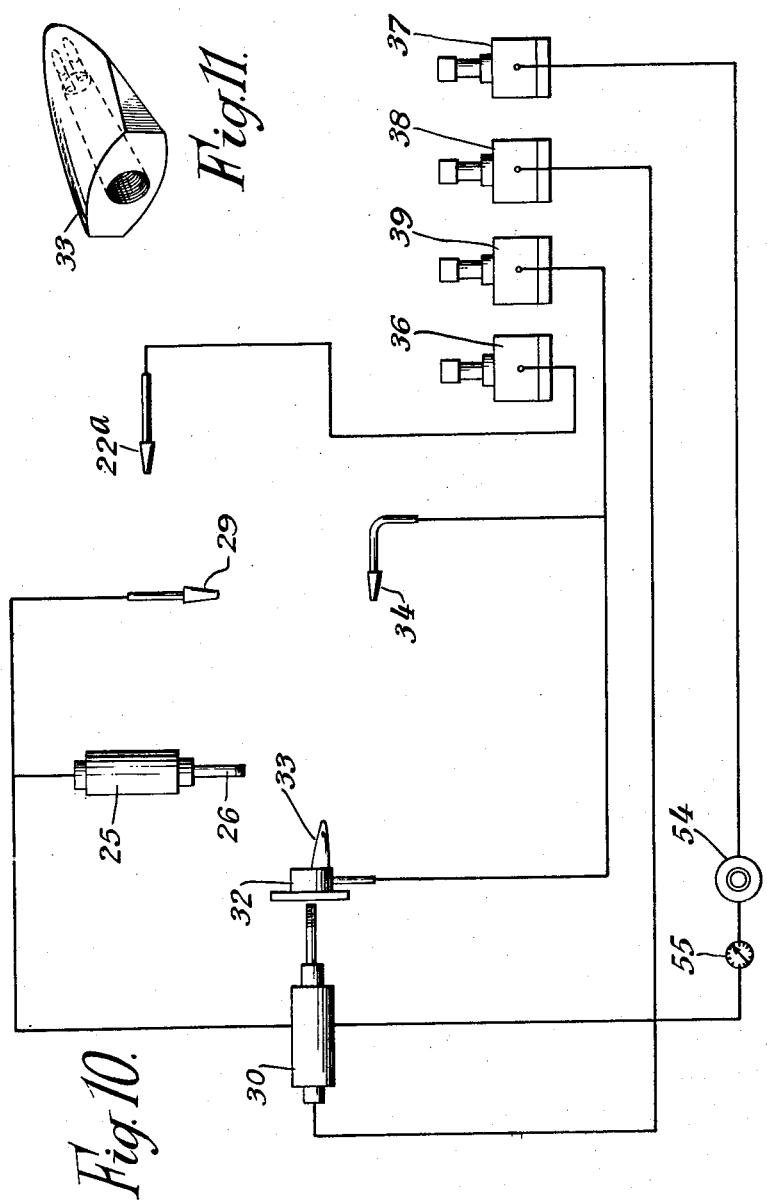

United States Patent Office 3,110,926
Patented Nov. 19, 1963

3,110,926
APPARATUS FOR THE TREATMENT OF
EDIBLE CRUSTACEA
John Martin, Fleetwood, England, assignor to Associated Fisheries and Foods (Fleetwood) Limited
Filed Apr. 19, 1960, Ser. No. 23,178
Claims priority, application Great Britain Apr. 24, 1959
6 Claims. (Cl. 17—2)

This invention relates to an improved apparatus and process for the treatment of crustacea such as crayfish, prawns and the like, and particularly the species known as Dublin Bay prawns (*Nephrops norvegious*), to clean out the contents of the black vein, or sand sac, from the tail portions and render it ready for marketing as processed products for human consumption. The tail portions of these creatures are severed from the non-edible head and body portions, and they then require to have the edible flesh separated from the enclosing shell.

It is well known that according to the methods of processing hitherto practised considerable skill has been required for, not only is it necessary to remove the edible flesh from the shell, but also it has been particularly necessary to remove the contents of the black vein or sand sac which runs substantially the full length of the tail of the prawn, and terminates at the tail end of the fish in the central tail fin. Hitherto, this last objective had been reached by removing the vein or sac itself together with its contents, sometimes with the use of tweezers or like tools.

Prior to the present invention, the processing of these crustacea was effected entirely by manual operation and, consequently, processing even by skilled labour was slow and laborious. Further, only comparatively unskilled labour was available. However, it is essential that the contents of the sand sac be removed completely from the body or flesh of the fish, otherwise such contents reduce the market value of the goods as they render the scampi distasteful to many people. This has been one of the main causes of complaints from purchasers. Complete removal of the sand sac itself, as hitherto practised is a delicate operation often necessitating the use of tools such as tweezers, and complete manual removal of the sand sac has been facilitated by carrying out this operation after the flesh or body of the fish has been separated from the shell.

The object of the present invention is to provide an improved process and apparatus for the treatment of these edible crustacea whereby the removal of the contents of said vein or sac and even of the vein or sac itself (when this is desired) can be effected easily and quickly, and with comparatively unskilled labour, so that a much better and cheaper product results.

The present invention provides a method of processing the tail portions of crustacea, such as crayfish, prawns and the like, to remove the contents of the sand sac, wherein the contents of such sand sac or vein are flushed or sluiced out by fluid pressure introduced into one end of the tail. The fluid, in some cases, may be arranged to remove the vein or sac itself as well as the contents thereof. Such removal can be accomplished by the use of water ejected under suitable pressure from a nozzle applied to the crustacea at one end, preferably in the region of the anus.

The invention also provides an apparatus for carrying out the said method which includes a holding means for holding the said tails resiliently with the ends exposed, and means for bringing one end of the held tail (usually the rear end) with the sand sac or vein in register with a pressure nozzle and for directing a fluid jet into the vein when so registered.

Usually, though not necessarily, the invention will be combined with the improved method and apparatus set forth in my co-pending application Serial No. 23,177, filed April 19, 1960, and which relates to the combination of vein flushing means with flesh removal means and especially to the separation of the edible flesh of the crustacea tail from the shell. In the preferred forms of such a combined arrangement one or more vein-flushing stations will be succeeded by a corresponding number of de-shelling stations, and there will be co-ordinated step-by-step feeding means to bring a continuous succession of the tails through the flushing and de-shelling stations, with means to take away the contents of the veins and ejected veins, the ejected flesh, and the empty shells to appropriate collectors. In most cases water will be used in the preliminary process to flush out the contents of the sand sac, and air will be used in the final process to separate the bodies from the shells.

One example of apparatus for carrying out the invention according to the improved method of this invention is illustrated in the accompanying drawings, wherein:

FIG. 1 is a perspective view partly in section of the tail portion of a crayfish, from opposite ends;

FIG. 2 is an elevation of a machine which will automatically feed the crustacea tails one after another to a holding means, insert an air nozzle into the rear end of the held tail and, after ejection of the edible flesh from the shell, will convey away both the ejected flesh and the empty shell to respective collectors;

FIG. 3 is a plan of the machine;

FIGS. 4 and 5 are side elevation and plan respectively of the means for holding the crustacea tail while the fleshy body is removed from the shell;

FIGS. 6 and 7 are a sectional side view and a fragmentary rear view of a modified means for holding, flushing and de-shelling the crustacea tail;

FIGS. 8 and 9 are respectively side elevation and front view of a part of a driving means for giving alternating intermittent movements to parts of the mechanism shown in FIGS. 2 and 3;

FIG. 10 is a diagram showing the layout of the pneumatic system the main components of the machine; and FIG. 11 is a perspective view of one of the air nozzles for insertion into the shell of the tail.

Referring first to FIG. 1 the tail portion of a crayfish, the severed head and body part of which has been discarded as waste, has an upper tegulated hard shell *a* the lower extremities of which have a notched form providing recesses *b* between feet or fins *c*. This shell *a* is bridged by a flexible horny membrane *d* between which and the said shell *a* the edible flesh *e* is held. This flesh is traversed by the sand sac or vein *f* terminating at the anus *g* in the centre tail fin *h*, between two horn-like protuberances *i*. There are also two side tail fins *j*.

Referring now in the main to FIGS. 2 to 5 and 8 to 10, a machine for mechanically and automatically carrying out a continuous process according to the invention comprises a base 10 (which would be the top of a table-like structure) on which is mounted an electric motor 11 (this could be below the base 10,) the motor driving by a belt and pulley drive 12, a cam shaft 13. At one end this cam shaft 13 drives a double Geneva motion 14 (see FIGS. 8 and 9), one part of which gives an intermittent drive to the shaft 15 of an endless belt discharge conveyor 16 arranged to convey away the ejected flesh portions of the crustacea tails after they have been ejected from their shells by an air nozzle as is explained below. The shaft 15 also drives a transit conveyor 24 described below.

The other part of the Geneva motion gives an intermittent drive to bevel gears 17, 18, the latter being fixed to a shaft 19 which, through a chain 20 and sprockets 21 imparts the intermittent drive to an endless belt feed conveyor 22. Obviously, because of the Geneva motions, each partial rotation of shaft 15 will be slightly behind the corresponding partial rotation of shaft 19. The crustacea tails, in some cases after removal of one or more of the tail fins, are delivered singly and in end to end order, rear end foremost, to the feed conveyor belt 22 by hand or by any suitable automatic means. There could be for example a means receiving them in random arrangement and so orientating them that they are delivered to the belt 22 in end-to-end spaced relationship with the rear end leading. It is necessary, in the machine shown, that the tails reach the transit conveyor 24 upside down as well as the rear end leading.

Each tail of a prawn or the like arriving at the delivery end of feed conveyor 22 is delivered therefrom to one of a number of shallow troughs, buckets or scoops 23, arranged transversely of and spaced along the length of the said transit conveyor 24 which is disposed at right-angles to the feed conveyor 22 (see especially FIG. 3) and such transit conveyor is driven intermittently by the shaft 15 in step with and at the same speed as the conveyors 16 and 22 but, as explained above, conveyor 22 is a step in advance of conveyor 24 so that it always delivers to a stationary trough or bucket 23 on the conveyor 24. To assist in the complete transfer into the trough 23 an air nozzle 22$^a$ is arranged to discharge periodic jets of air at the correct time to blow the tail into the stationary trough. The mechanisms for this is explained below. A stop plate 24$^d$ along the front of conveyor 24 serves as a limit stop when engaged by the tail fins $h$ and $j$.

The transit conveyor 24 is adapted by its stepwise movements to locate each prawn or like tail in turn below a holding means and, when so disposed and held, each tail remains stationary (the conveyor being stationary at such time) ready to receive a slidably mounted ejector air nozzle 33 as the latter is moved towards the adjacent end of the prawn on actuation of the pneumatic system diagrammatically illustrated in FIG. 10. This nozzle is of spear head form (see FIG. 11) so as to pierce the horny membrane $d$ in the region of the anus $g$ as it is jabbed into the tail.

One form of holding means is shown in FIGS. 4 and 5. It comprises a pneumatic cylinder 25 with a vertically slidable ram 26, and to the lower end of said ram is attached a crosshead 27, guided by sliding rods 27$^a$ and carrying on its under face a resilient presser block or pad 27$^b$. As illustrated more clearly in FIG. 4, the pad or block 27$^b$ is inclined on its under surface so as to accommodate itself to the tapering form of the crustacea tail. As these tails vary in size, the troughs 23 of the transit conveyor 24 may be of a springy material, e.g. a flexible but stiff synthetic material so as in the case of small tails, to be deformed by the descending pad 27$^b$ until that pad engages the tail with a holding pressure.

In the form illustrated the conveyor 24 is made up of two roller chains to which the buckets or scoops 23 are attached. In order to resist the downward thrust of the pad 27$^b$, supports 1$^a$ standing up from the base 10 engage the ends of the bucket 23 when under the pad 27$^b$.

The holding means are mounted in a bracket 28 attached to the front of the machine and, located in said bracket and downwardly extending therefrom, is a tail spreader nozzle 29 adapted to impart a blast of air to the tail fins of the prawn and spread them on a supporting bracket (see the part 1$^a$ in FIG. 4 or the part 29$^a$ in FIG. 6) just before the ejector air nozzle 33 (described below) moves forward to penetrate the tail.

As stated above, the machine illustrated requires that the tails be upside down. In order to prevent their turning over under the stepwise jerky advance of the conveyor, and in order also to resist the tendency of the advancing nozzle 33 to push the tails along the scoops or buckets, wire guides 24$^b$ and 24$^c$ are provided, mounted at their ends on suitable fixed parts of the machine and adapted to engage in some of the recesses $b$ of the tails. Furthermore, the wire 24$^b$ is deflected in the approach to the holding means so as to assist in flattening out the tail fins. This is important not only to ensure that the advancing nozzle 33 will be above the centre tail fin $h$ but also to ensure that the horn-like protuberances $i$ are in position to engage the sides of the nozzle and centre the tail relatively to the axis of the nozzle.

Located in the bracket 28 is a second cylinder 30, disposed horizontally, that is at right-angles to the air cylinder 25. This cylinder 30 has a ram 31 on which is mounted the nozzle housing 32 from which extends the said air nozzle 33. The nozzle 33 is removable for interchange or cleaning or sharpening. It is of spear head form, see FIG. 11, with sharpened side edges and a point adapted to pierce the horn-like membrane $d$ of the tail. The air outlets of the nozzle are in its underside.

Opposite the nozzle 33 and running along the rear edge of the discharge conveyor 16 is a stop plate 16$^a$ which obstructs the flesh ejected from the shells by the nozzle and causes it to remain on or to drop back on to the discharge conveyor.

As will be clear from FIGS. 3 and 10 the pneumatic system also includes a further nozzle 34 adapted to remove the empty shells from the conveyor 24 after they have been operated on by the ejector air nozzle 33, and to pass them into a chute 34$^a$. Also shown in FIGS. 3 and 10 is the control means whereby the pressure air supply is delivered to each of the several nozzles as and when required, in timed relationship with the various mechanical operations of the machine. Such control means comprises a valve block 35 located on the base 10 below the cam shaft 13, in which block are four air valves 36, 37, 38 and 39 adapted to be operated respectively by cams 40, 41, 42 and 43 fixed on the cam shaft 13. By this arrangement the four valves are actuated by their respective cams in timed relationship with the drive to the various conveyors of the machine, and a continuous process results. The valve 36 controls the nozzle 22$^a$ for transfer of the tail from conveyor 22 to conveyor 24; valve 37 controls the descent of the holding pad 27$^b$ and pad 46 and the operation of the tail spreader nozzle 29; valve 38 advances the nozzle 33 and valve 39 controls the discharge of air from the nozzle 33 and the discharge of water from the nozzle 52 as well as the operation of the shell ejector nozzle 34.

In operation, the crustacea tails are received in endwise succession by the feed conveyor 22 and are delivered one by one to the successive scoops or buckets 23 of the conveyor 24 in upside down position at a loading station 56 with their tail fins extending towards the front of the machine. The conveyor 24 is moved stepwise and each prawn or the like in turn becomes positioned beneath the holding means. At this juncture air is admitted to the cylinder 25 by air valve 37 and the presser block or pad 27$^b$ moves downwards to hold the prawn or like tail against the stationary bucket or scoop 23 to hold the tail and await the insertion into the tail of the ejector air nozzle 33 which is effected by actuation of the air valve 38 to admit air to cylinder 30 to move the nozzle and its housing towards the prawn.

Actuation of air valve 37 also admits air to the tail fin nozzle 29 which releases an air blast to spread the tail fin to ensure that as and when the nozzle 33 moves on to the tail the latter is correctly disposed and insertion is effected at the correct point. The blast or air from nozzle 33, under control of valve 39 then ejects the fleshy body portion of the tail from the shell on to the discharge conveyor 16. The presser pad 27$^b$ is now lifted to release the prawn, and the conveyor belts are all moved by their respective Geneva motions to bring the next prawn or the like beneath the holding means, and to move both the ejected flesh on conveyor 16, and the empty shell in the scoop 23 towards their respective collecting points.

It will be seen from FIG. 10 that the ejector air nozzle 33 which removes the edible fleshy body from the shell, and the nozzle 34, at discharge station 57, for removal of the empty shell out of the conveyor 24 are on the same air line and therefore operate simultaneously, so that as nozzle 33 is effecting removal of the flesh from one tail, the other nozzle 34 is blowing the empty shell of another tail from the conveyor 24. The tail jet 29 and the presser pad 27$^b$ may also be actuated simultaneously. The strength of the air blast from the nozzle 34 is enough to remove an empty tail shell from conveyor 24, but is not sufficient to remove a prawn or like tail which has not been successfully operated upon by the ejector nozzle 33. By this arrangement, the empty shells and the full shells or only partly-emptied shells are delivered separately from the machine into their respective receptacles.

Each body successfully and cleanly ejected from its shell eventually falls off the end of the conveyor 24 into a chute 24$^a$ leading to a collecting receptacle (not shown).

The pneumatic system includes a reducing valve 54, a gauge 55, and a flow regulator, in order to ensure good control of the air pressure and successful operation of the machine. The air pressure supply may be from a separate compressor unit and accumulator, or such unit may be built into the machine.

Referring now to FIGS. 6 and 7 a modified and more preferred arrangement is shown. In this case flushing of the sand sac takes place at one station and separation of the edible flesh from the shell takes place at another point.

As shown, there is an upright stand 61 with overhanging arm 62, this stand being built on the base or table 10 of the machine. Said arm 62 carries a pneumatic cylinder 63 whereby a head 44 may be raised and lowered, being guided by the rods 45. This head 44 is fitted on its lower side with a resilient pad 46 adapted, as the head descends, to grip the tail with a gripping pressure along the whole length of the tail, the tail at the time being held in the bucket or scoop 23.

Carried by the head 44 is a plate 47 from which is suspended a block 48, here being compression springs 49 between this block and the plate 47. The block 48 is ported at 50 and receives water under the control of a fifth valve (not shown) operated from the before-mentioned cam shaft 13.

Below the said block 48 is a rubber or like resilient nozzle 52, the orifice of which is in communication with the said port 50, and the lower end of which is tapered so as to be co-planar with the lower face of the pad 46 when the parts are unstressed. Such orifice is large enough to ensure its being open to the anus of the tail, regardless of the size of the tail.

In operation, with a tail lying in the scoop 23 and held stationary below head 44, first the tail is gripped by the descending pad 46 and then water under pressure is admitted to the port 50. Because, at that time the outlet of the nozzle 52 is in register with the adjacent end of the sand sac in the tail, the water jet or stream from the nozzle flushes the contents of the sac out at the larger end of the tail. Thereafter, the water is shut off by the valve 39, or by the said fifth valve, the head 44 is raised and the bucket 23 is moved on by the conveyor 22 to the next station, indicated at 53 in FIG. 7, where the body of the creature is ejected from the shell as set forth above.

As explained above, flushing of the sand sac takes place at one station and separation of the edible flesh from the shell takes place at another point.

What I claim is:

1. Apparatus for cleaning tail portions which have been severed from the head and body portions of crustacea such as crayfish, prawns and the like, said apparatus comprising conveyor means advancing a plurality of said tail portions individually and successively along a path through a flushing station; intermittent drive means actuating said conveyor for halting each successive tail portion thereon at said flushing station along said path; holding means, at said flushing station, engaging the shell of said tail portion and retaining the same against movement; and flushing means at said flushing station, including flushing mechanism moving into and out of engagement with each tail portion, said mechanism applying fluid pressure to the region of, and introducing fluid pressure into, one end of the black vein, or sand sac, of said tail portion to flush the contents thereof out of the opposite end of said vein while said tail portion is so held against movement.

2. Apparatus as specified in claim 1 wherein said flushing mechanism includes a nozzle having an enlarged orifice adapted to register with the anus of tail portions of various sizes gripped in said holding means.

3. Apparatus as specified in claim 1, wherein said conveyor means includes a horizontal upper stretch having a plurality of troughs of self supporting, resilient, yieldable material spaced therearound, each for supporting one of said tail portions in upside down position; and said holding means includes a vertically movable pad of flexible, resilient material having a lower face inclined to conform to the shape of a tail portion supported in one of said troughs and means for moving said pad downwardly at said flushing station to clamp said tail portion in said trough.

4. Apparatus as specified in claim 3 wherein said flushing mechanism includes a vertically movable nozzle having an enlarged orifice arranged to register with the anus of a tail portion held in a trough at said flushing station, said nozzle being associated with said pad for vertical movement therewith and having an inclined face at said orifice normally coplanar with the face of said pad when said pad is unstressed.

5. Apparatus as specified in claim 1 wherein said flushing mechanism includes a nozzle mounted to move into and out of registration with the anus of a tail portion at said flushing station; a source of liquid under pressure connected to said nozzle and control means for moving and actuating said nozzle in timed relationship with said drive means.

6. Apparatus for cleaning tapered tail portions which have been severed from the head and body portions of crustacea, such as crayfish, prawns and the like, said apparatus comprising means for advancing a plurality of said tail portions individually and successively along a horizontal path to a flushing station, each in upside down position with the small ends thereof aligned along one side of said path; vertically movable holding pad of resilient yieldable material mounted above the path of the large ends of said tail portions at said flushing station, said pad having a lower face inclined to conform to the tapered shape of said tail portions; a water nozzle, having an enlarged orifice, mounted above the path of the small ends of said tail portions at said flushing station, the lower face of said nozzle being coplanar with the lower face of said pad, control means vertically reciprocating said pad and nozzle at said flushing station and actuating said nozzle when in registration with the anus of a tail portion resiliently engaged by the lower face of said pad and means for continuing the advance of said tail portions away from said flushing station after the actuation of said nozzle.

References Cited in the file of this patent

UNITED STATES PATENTS

| 2,546,414 | Abbott | Mar. 27, 1951 |
| 2,622,270 | Envoldsen | Dec. 23, 1952 |
| 2,625,705 | Avetta et al. | Jan. 20, 1953 |
| 2,641,797 | Waltman | June 16, 1953 |
| 2,644,980 | McKinstry | July 14, 1953 |
| 2,753,589 | Sloan | July 10, 1956 |
| 2,784,450 | Jonsson | Mar. 12, 1957 |